United States Patent
Chang

(10) Patent No.: US 7,505,386 B2
(45) Date of Patent: Mar. 17, 2009

(54) RADIAL RUNOUT DETECTION METHOD AND DEVICE FOR AN OPTICAL DISK DRIVE

(75) Inventor: Chia-Ming Chang, Pingjhen (TW)

(73) Assignee: Sunplus Technology Co., Ltd, Hsinchu (TW)

( * ) Notice: Subject to any disclaimer, the term of this patent is extended or adjusted under 35 U.S.C. 154(b) by 498 days.

(21) Appl. No.: 11/294,568

(22) Filed: Dec. 6, 2005

(65) Prior Publication Data

US 2006/0262675 A1    Nov. 23, 2006

(30) Foreign Application Priority Data

May 23, 2005    (TW) .............................. 94116726 A

(51) Int. Cl.
*G11B 7/095* (2006.01)

(52) U.S. Cl. ................. 369/53.14; 369/30.24

(58) Field of Classification Search ....................... None
See application file for complete search history.

(56) References Cited

U.S. PATENT DOCUMENTS

| | | | | | |
|---|---|---|---|---|---|
| 4,149,199 A | * | 4/1979 | Chick et al. | ............. | 360/77.04 |
| 4,775,966 A | * | 10/1988 | Miura et al. | ............. | 369/44.32 |
| 5,197,058 A | * | 3/1993 | Bell et al. | ............. | 369/44.28 |
| 6,370,094 B1 | * | 4/2002 | Kishinami et al. | ........ | 369/44.32 |
| 2005/0152246 A1 | | 7/2005 | Li et al. | .................... | 369/47.44 |

* cited by examiner

*Primary Examiner*—Wayne R Young
*Assistant Examiner*—Brian Butcher
(74) *Attorney, Agent, or Firm*—Bacon & Thomas, PLLC

(57) ABSTRACT

A radial runout detection method and device for an optical disk drive, which sets a reference locus at a location distant from a current beam locus by M, a minimum track number, a maximum track number and a detection time, and executes the following steps in the detection time: increasing M when a data track across the current beam locus moves toward a direction of the reference locus, and otherwise decreasing M; setting the minimum track number as M when M decreased is smaller than the minimum track number; setting the maximum track number as M when M increased is greater than the maximum track number. Accordingly, a runout track number is computed by subtracting the minimum track number from the maximum track number.

12 Claims, 7 Drawing Sheets

2

RADIAL RUNOUT DETECTION METHOD AND DEVICE FOR AN OPTICAL DISK DRIVE

BACKGROUND OF THE INVENTION

1. Field of the Invention

The invention relates to a radial runout detection method and device and, more particularly, to a radial runout detection method and device for an optical disk drive.

2. Description of Related Art

With the advance of information technologies, optical disks capable of storing a large quantity of data have become an essential storage in a computer system. Accordingly, optical disk drives are now standard equipment in a computer to read and write the optical disks. FIG. 1 shows a schematic view of an optical disk 11 with stored information. As shown in FIG. 1, the surface on the optical disk 11 has multiple data tracks 112 centering the disk center 111 in a substantially concentric arrangement, thereby recording the information. FIG. 2 shows a schematic view of an optical disk drive reading the information on the optical disk 11. As shown in FIG. 2, the optical disk 11 is placed on a turntable 14 and driven by a spindle motor 12 to rotate, and a movable optical pickup unit 13 generates a laser beam. The laser beam generates a beam spot on the surface of the optical disk 11. The beam spot is reflected to thus read the information on the optical disk 11. Ideally, when the optical disk 11 is rotated by the spindle motor 12, a beam locus 31 shaped by the beam spot generated by the optical pickup unit 13 falls just on a data track 112 to accordingly read the information on the optical disk 11. However, in practice, as shown in FIG. 3, due to poor manufacture of the optical disk 11, slanting of the turntable 14 and displacement of the spindle motor 12 may cause the center 111 of the data track 112 of the optical disk 11 and a center 111' at rotation to fail to locate at the same point, which further causes so-called radial runout. Thus, the beam locus 31 shaped by the beam spot and the data track 112 are displaced from one another.

In order to detect the magnitude of the radial runout and accordingly correct the optical disk drive to accurately read the information of the optical disk 11, a typical approach is to use a tracking error (TE) to compute a track-crossing number that indicates the number of data tracks 112 crossed by the beam locus on the optical disk 11 during a period in which a predetermined number of revolutions is performed. FIG. 4A shows a schematic view of a data track 112 crossed by a beam locus 31 for one revolution. As shown in FIG. 4A, the runout track number (radial runout measured in tracks) is about a half of the number of data tracks 112 crossed by the beam locus 31 as the optical disk 11 rotates for one revolution. Accordingly, FIG. 4B is a flowchart of a radial runout computation. As shown in FIG. 4B, when the optical disk 11 rotates for a predetermined number of revolutions, the number of data tracks 112 crossed by the beam locus 31 is computed to thus find the runout track by dividing the track-crossing number by two times the predetermined number of revolutions, thereby obtaining the radial runout.

However, such a radial runout detection needs to know the predetermined number revolutions. In this case, the spindle motor used is a three-phase AC motor equipped with a Hall sensor to generate a FG signal with respect to the rotation frequency. Thus, the number of revolutions is obtained. However, the three-phase motor and its equipped driver are expensive. In order to reduce the cost, a typical low-speed optical disk system uses typical single-phase DC motors as the spindle motors. In this case, there is no FG signal as a reference so that the predetermined number of revolutions cannot be obtained and the radial runout cannot be detected by the cited technique.

U.S. Patent Application Publication No. 20050152446 entitled "Method for detecting eccentricity of an optical disc, and optical disc drive that performs the method" is provided to detect a radial runout (eccentricity) of a testing disk on an optical disk drive, which controls the spindle motor of the optical disk drive at a predetermined rotation speed when the optical disk drive is on a focused and track-locked state, and performs a runout detection on the testing disk, thereby obtaining a runout value. The runout value obtained is further compared with a reference to determine a radial runout of the testing disk. The reference is a predetermined runout value obtained by previously testing a standard radial runout disk. Such a radial runout detection is carried out after the focusing and track-locking operations are complete. However, due to the radial runout of the tracks, a track-locking failure may occur, resulting in an unpractical detection of the radial runout.

Therefore, it is desirable to provide an improved radial runout detection method and device for an optical disk drive to mitigate and/or obviate the aforementioned problems.

SUMMARY OF THE INVENTION

The object of the invention is to provide a radial runout detection method and device for an optical disk drive, which can accurately detect a radial runout, without using the three-phase motor to obtain the number of revolutions by referring to the FG signal.

In accordance with one aspect of the invention, a radial runout detection method for an optical disk drive is provided. The optical disk drive uses an optical pickup unit to generate a beam spot. The beam spot shapes a beam locus on an optical disk, thereby reading stored information of multiple data tracks on the optical disk. The method includes the steps of: (A) setting a reference locus at a predetermined location distant from a current beam locus by M (M is a positive integer) tracks; (B) setting a minimum track number M_MIN, a maximum track number M_MAX and a detection time to execute steps (C) to (E) during the executing time; (C) when a data track crossing the current beam locus on the optical disk moves toward a direction of the reference locus with respect to the current beam locus, increasing the track number M, and otherwise decreasing M; (D) when the track number M decreased is smaller than the minimum track number M_MIN, setting the minimum track number M_MIN as the track number M; (E) when the track number M increased is greater than the maximum track number M_MAX, setting the maximum track number M_MAX as the cross-track number M; and (F) computing a runout track number by subtracting the minimum track number from the maximum track number.

In accordance with another aspect of the invention, an optical disk drive with a firmware program for detection of a radial runout of an optical disk is provided. The optical disk drive uses an optical pickup unit to generate a beam spot. The beam spot shapes a beam locus on an optical disk, thereby reading stored information of multiple data tracks on the optical disk. The program includes the steps of: (A) setting a reference locus at a predetermined location distant from a current beam locus by M (M is a positive integer) tracks; (B) setting a minimum track number M_MIN, a maximum track number M_MAX and a detection time to execute steps (C) to (E) during the execution number; (C) when a data track across the current beam locus on the optical disk moves toward a direction of the reference locus with respect to the current beam locus, increasing the track number M, and otherwise decreasing the track number M; (D) when the track number M decreased is smaller than the minimum track number M_MIN, setting the minimum track number M_MIN as the track number M; (E) when the track number M increased is greater than the maximum track number M_MAX, setting the maximum track number M_MAX as the track number M; and (F) computing a runout track number by subtracting the minimum track number from the maximum track number.

In accordance with a further aspect of the invention, a computer readable storage medium is provided, which stores a firmware program to detect a radial runout of an optical disk in an optical disk drive, wherein the optical disk drive uses an optical pickup unit to generate a beam spot, and the beam spot shapes a beam locus on an optical disk, thereby reading stored information of multiple data tracks on the optical disk. The program includes: a first code to set a reference locus at a predetermined location distant from a current beam locus by M (M is a positive integer) tracks; a second code to set a minimum track number M_MIN, a maximum track number M_MAX and a detection time to execute the third to fifth codes during the detection time; a third code to increase the cross-track number M when a data track crossing the current beam locus on the optical disk moves toward a direction of the reference locus with respect to the current beam locus, and otherwise to decrease M; a fourth code to set the minimum track number M_MIN as the track number M when the track number M decreased is smaller than the minimum track number M_MIN; a fifth code to set the maximum track number M_MAX as the track number M when the track number M increased is greater than the maximum track number M_MAX; and a sixth code to compute a runout track number by subtracting the minimum track number from the maximum track number.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
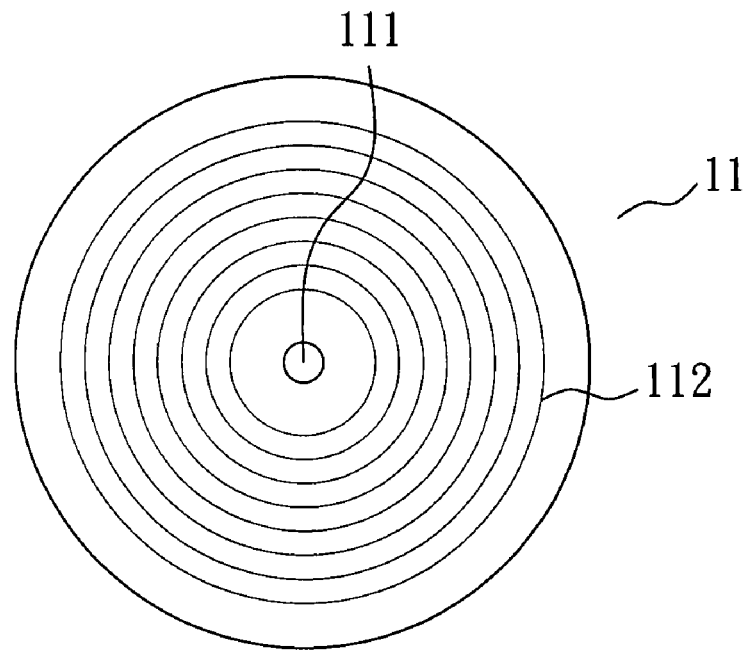
FIG. 1 shows a schematic view of a typical optical disk with stored information.
Figure 2:
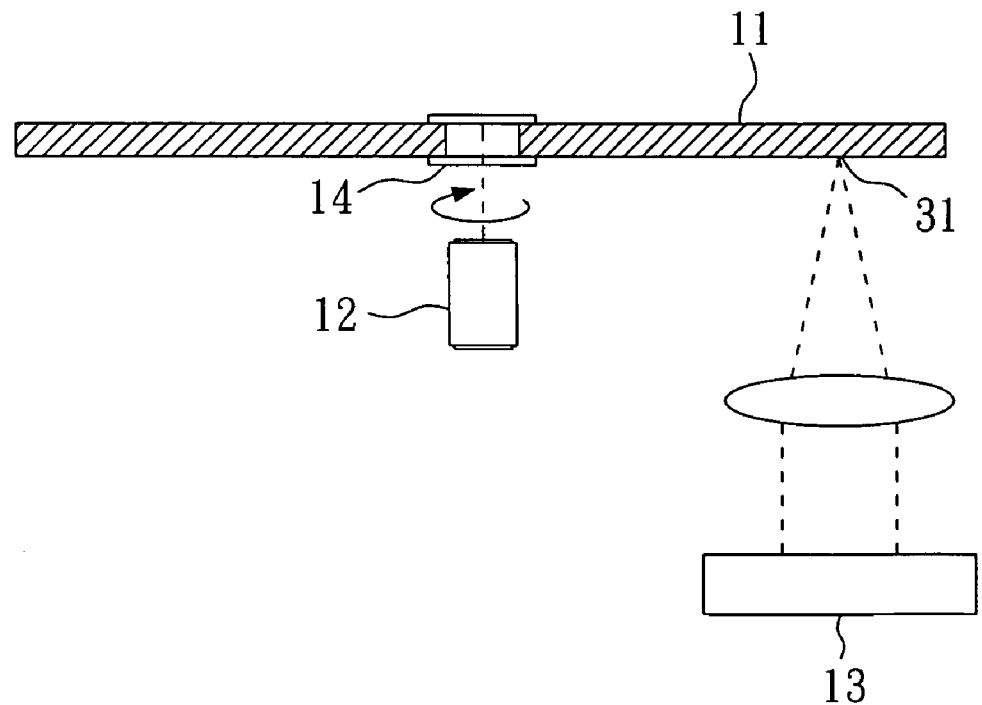
FIG. 2 shows a schematic view of a typical optical disk drive reading the information on an optical disk.
Figure 3:
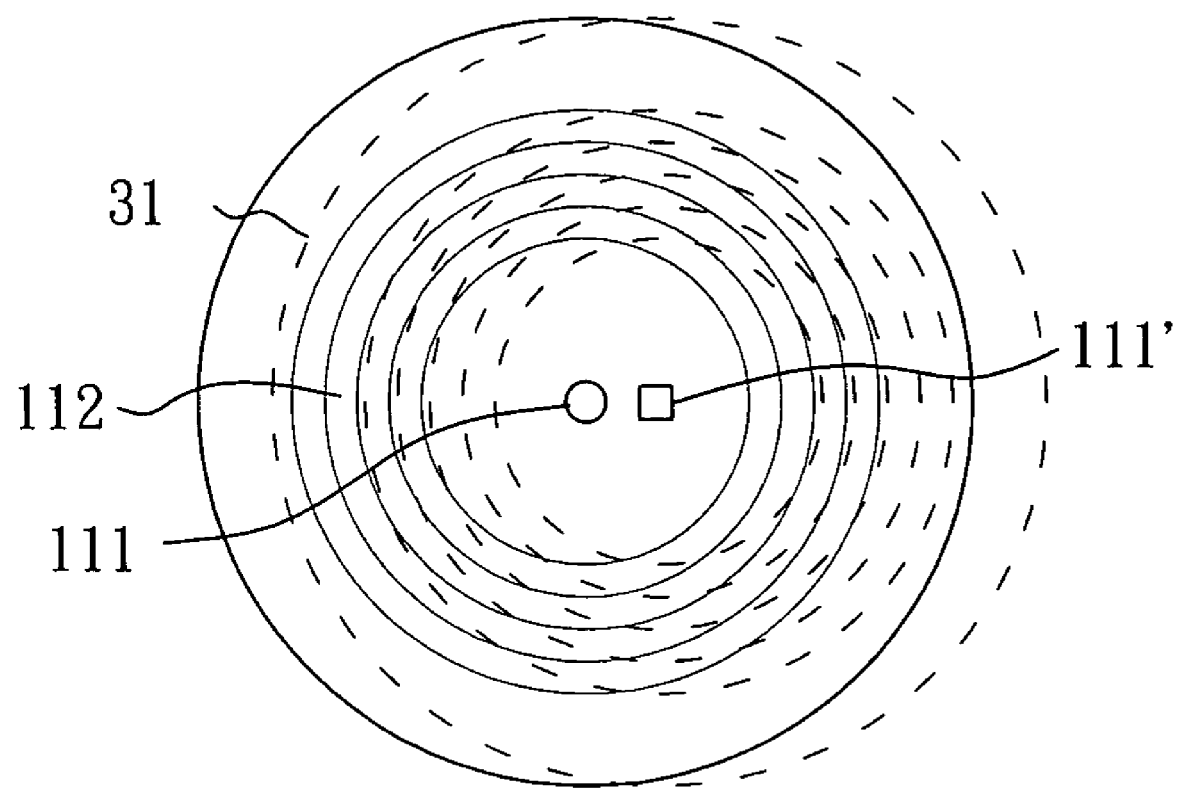
FIG. 3 shows a view of a radial runout generated on a typical optical disk.
Figure 4A:
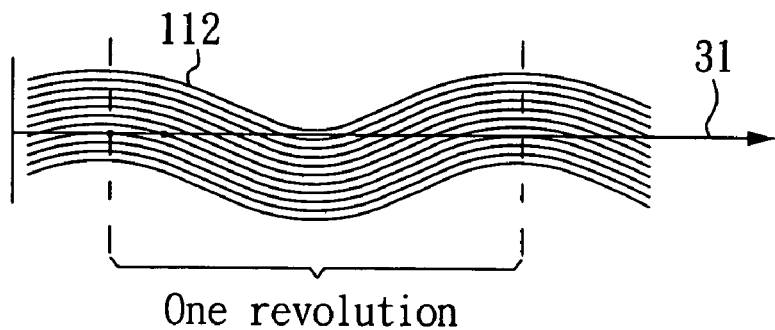
FIG. 4A shows a schematic view of a data track typically crossed by a beam locus for a rotary cycle.
Figure 4B:
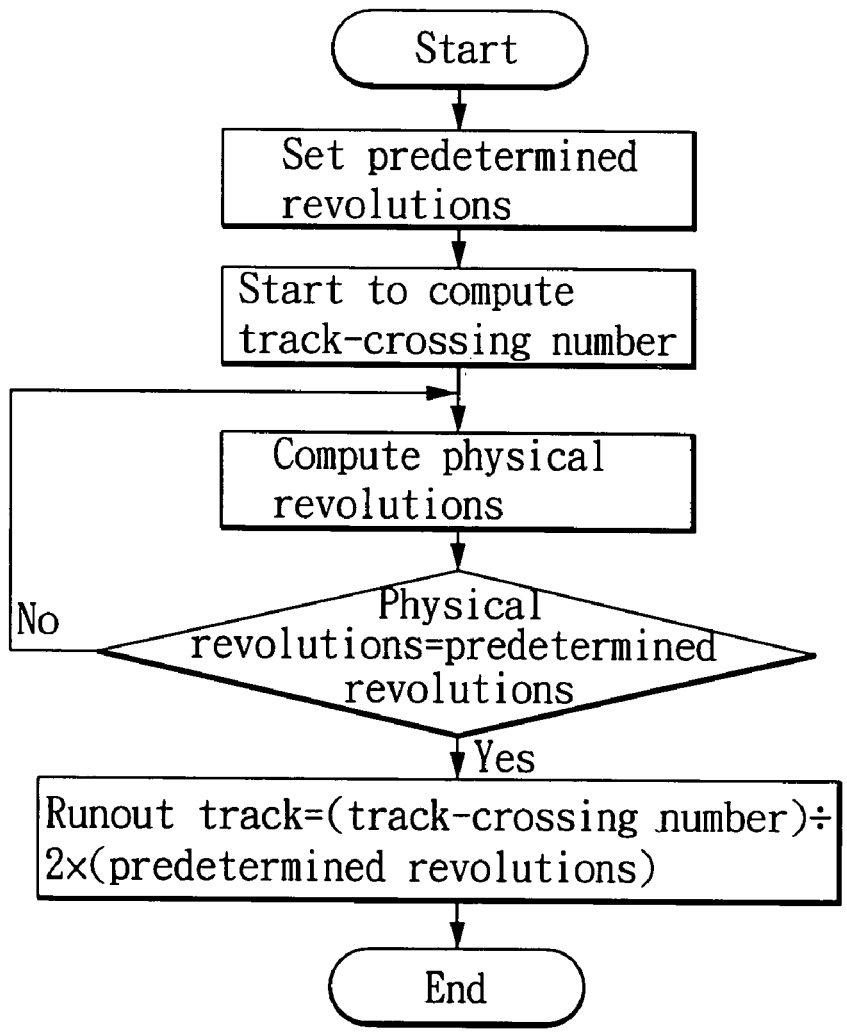
FIG. 4B is a flowchart of a typical radial runout computation.
Figure 5:
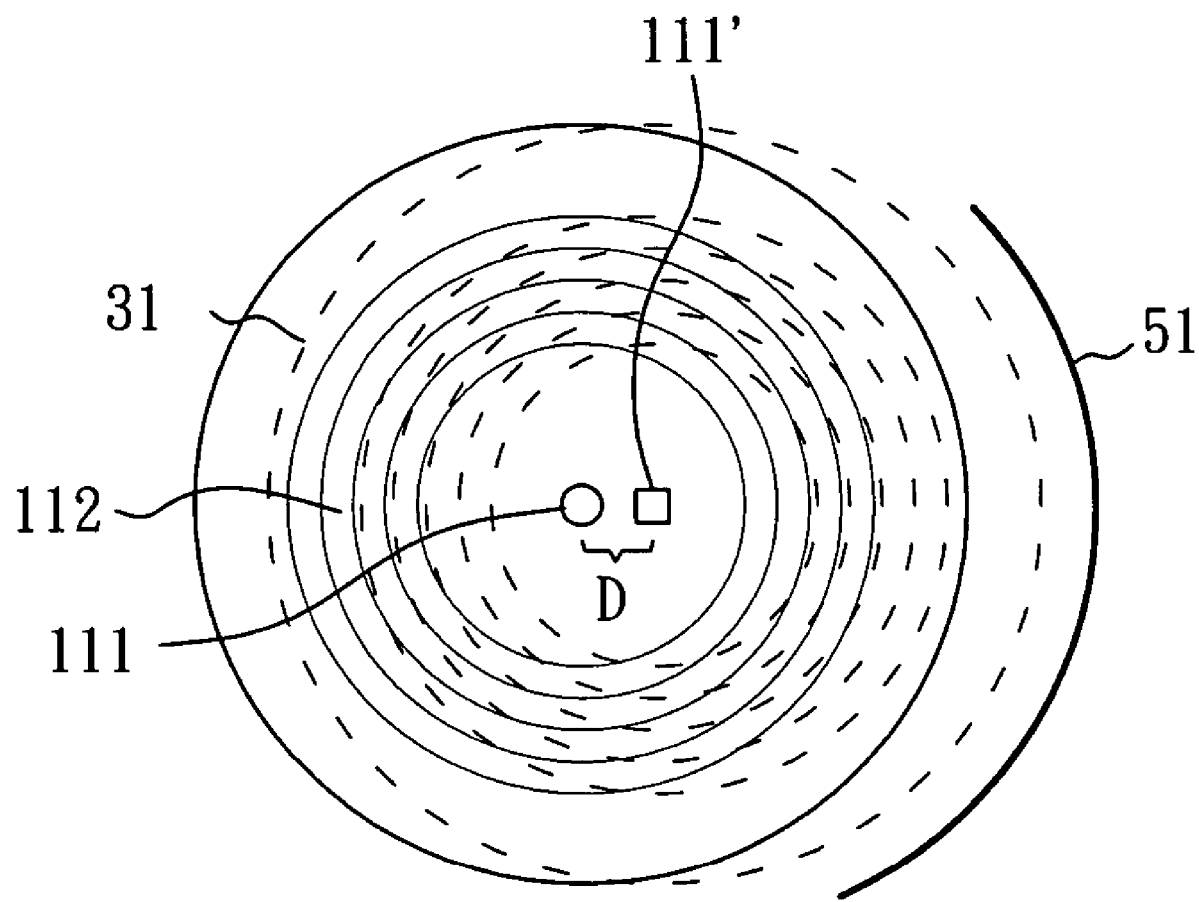
FIG. 5 shows a schematic view of a radial runout generated on an optical disk according to the invention.

FIG. 5 shows a schematic view of a radial runout generated on an optical disk 11 according to the invention, wherein solid circles indicate data tracks 112, and dotted circles indicate beam loci 31. As shown in FIG. 5, the center 111 of the data tracks 112 locates at different position from the center 111' of the beam loci 31 (i.e., the center of optical disk 11 at rotation), and thus a radial runout D between the centers 111 and 111' presents. In addition, in this embodiment, a reference locus 51 is defined. The reference locus 51 locates at an arbitrary distance from the center 111' of the beam loci 31.

Figure 6A:
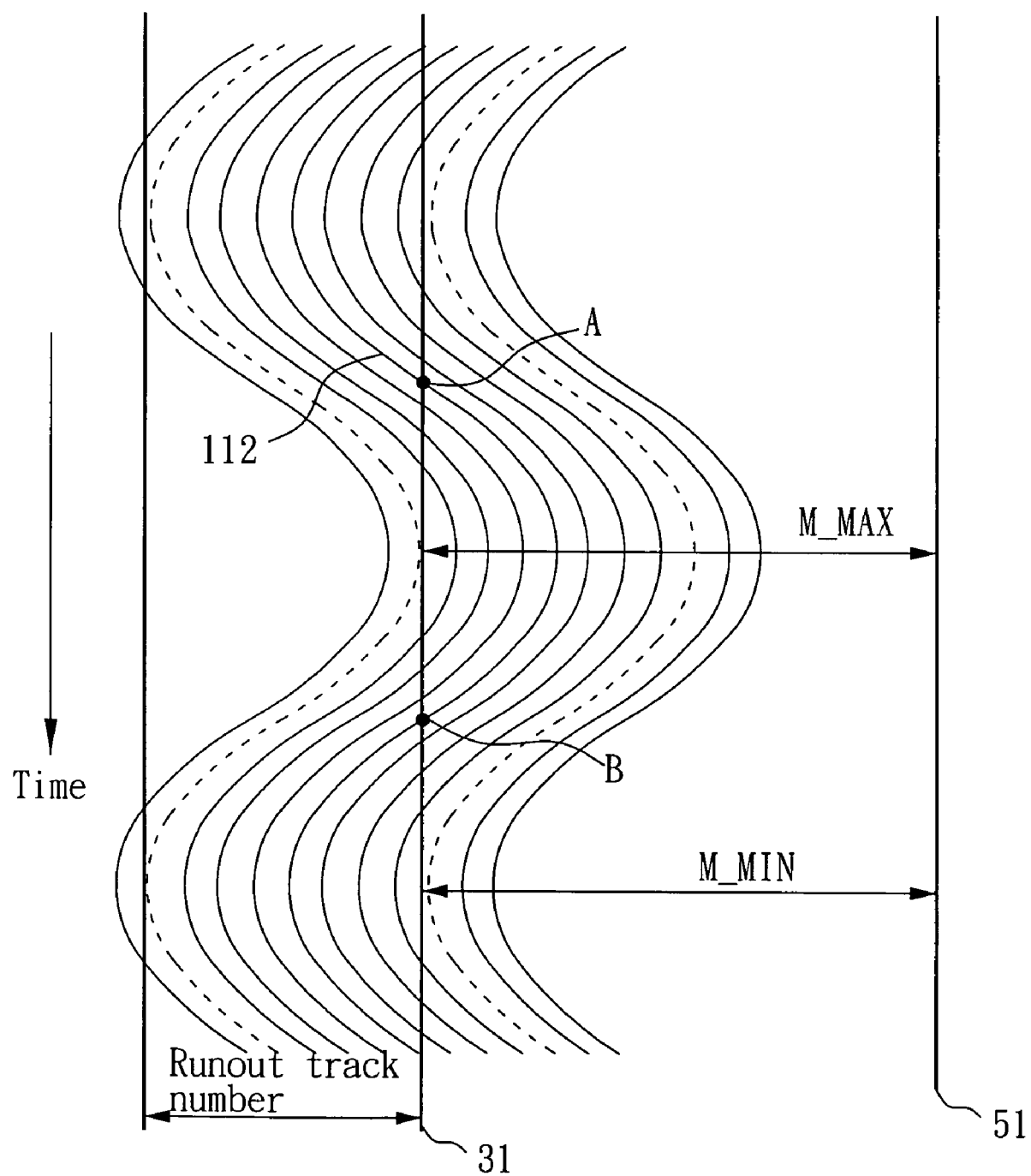
FIG. 6A shows a schematic view of a beam locus across a data track according to the invention.
Figure 6B:
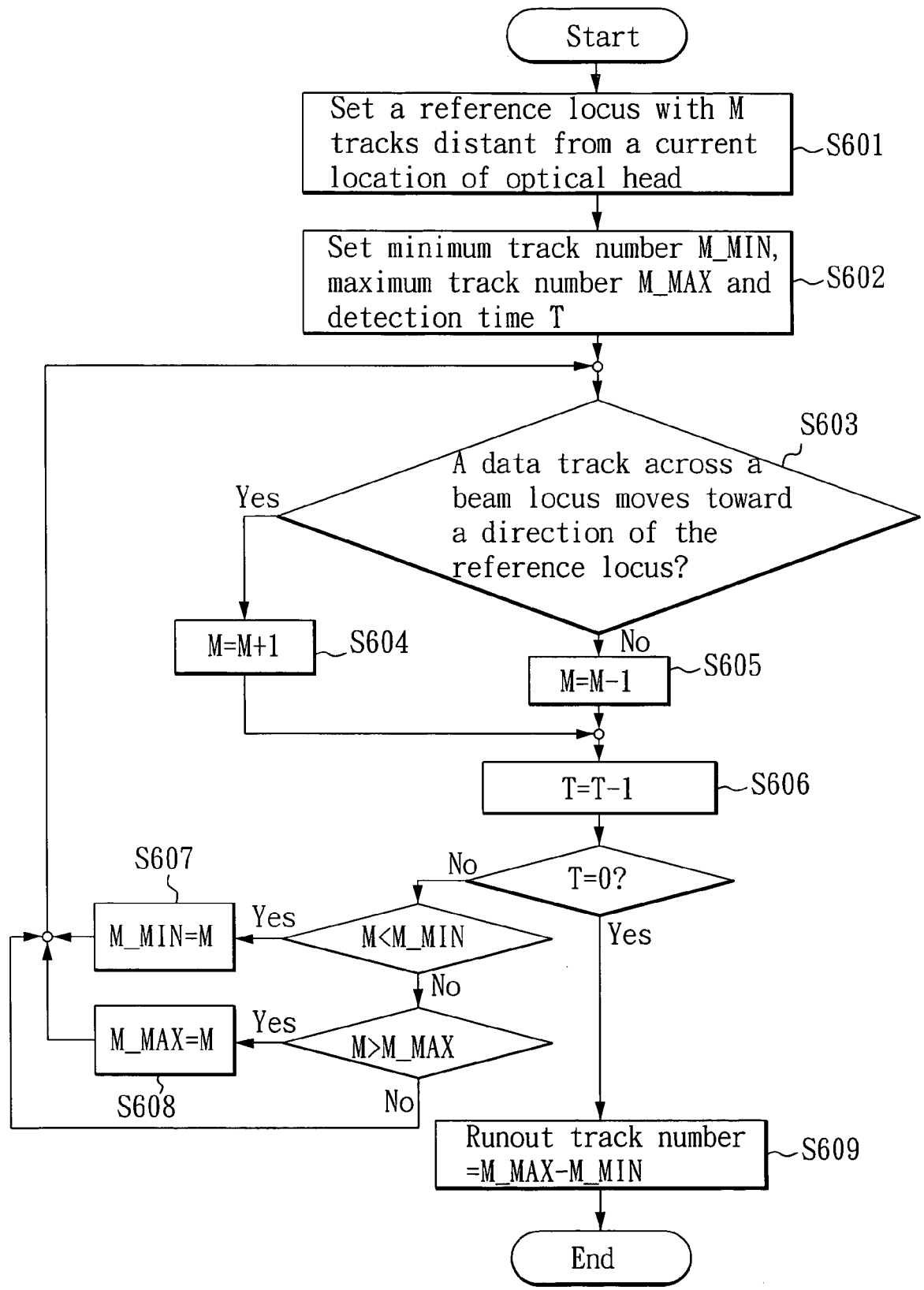
FIG. 6B is a flowchart of a radial runout computation of FIG. 6A according to the invention.
Figure 7:
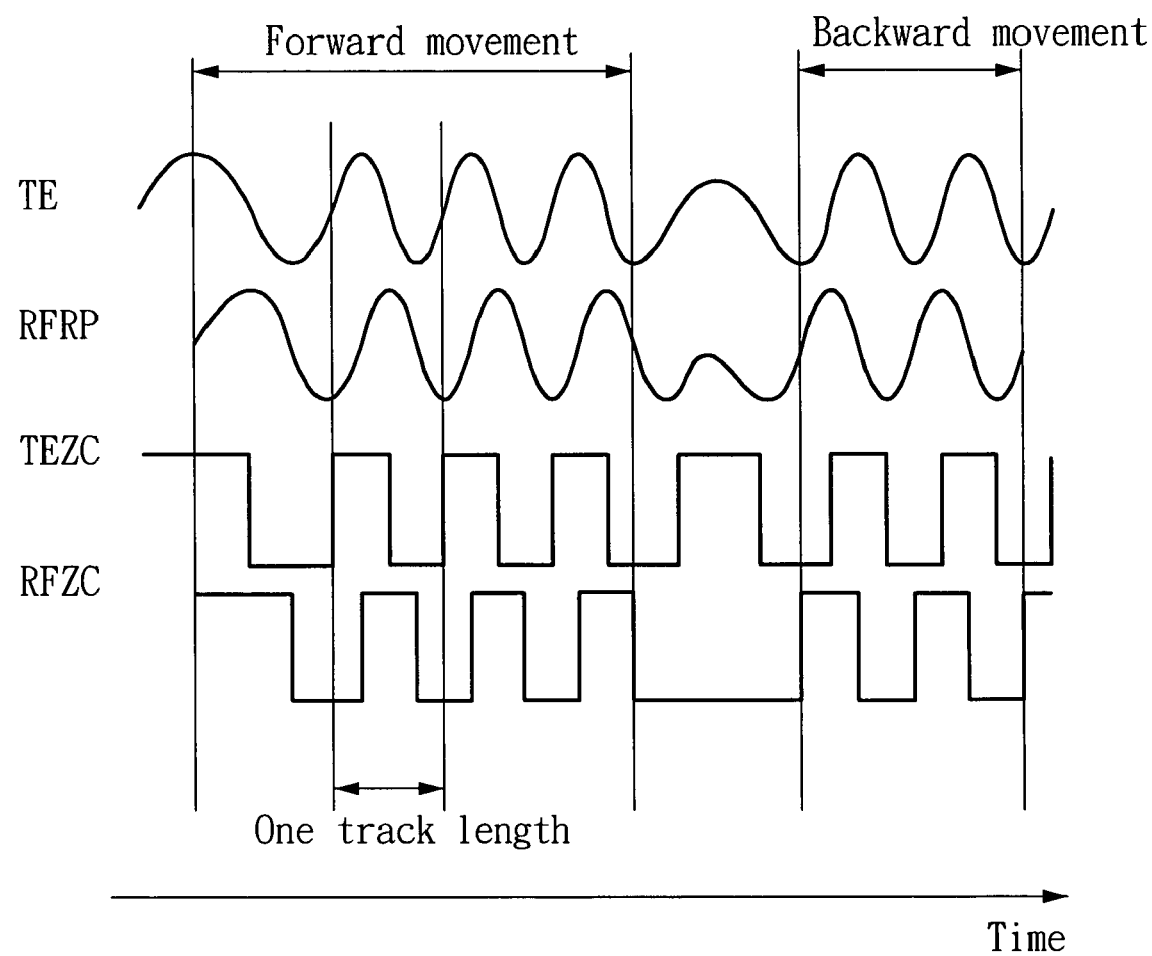
FIG. 7 illuminates a track-crossing direction decision according to the invention.

In order to detect the magnitude of the radial runout D, FIG. 6A shows a schematic view of a beam locus across data tracks, and FIG. 6B is a flowchart of a radial runout computation of FIG. 6A. As shown in FIG. 6A and 6B, step S601 is executed to set the reference locus 51 at a predetermined location distant from a beam locus 31 by M (M is a positive integer) tracks, wherein a beam spot currently generated from an optical pickup unit shapes the beam locus 31. Step S602 is executed to set predetermined minimum track number M_MIN, maximum track number M_MAX and detection time T. The minimum and maximum track numbers M_MIN and M_MAX can be initialized as M or other appropriate values. The detection time T is greater than required time for the optical disk 11 to spin one cycle. Step S603 determines if a data track 112 crossing the current beam locus 31 on the optical disk 11 moves toward a direction of the reference locus 51 with respect to the current beam locus 31, and accordingly increases (step S604) or decreases (step S605) the number M. A typical track-crossing direction decision uses a phase relation between a tracking error signal (TE) and a radio frequency ripple signal (RFRP) to make a decision on the optical disk 11 for a movement orientation. As shown in FIG. 7, tracking error zero cross (TEZC) and radio frequency ripple zero cross (RFZC) indicate TE and RFRP digital signals respectively. When the TEZC has a phase ahead of the RFZC, it indicates that the data track 112 is forwardly moved with respect to the beam locus 31. Conversely, when the TEZC has a phase behind the RFZC, it indicates that the data track 112 is reversely moved with respect to the beam locus 31. Accordingly, due to the radial runout, the beam locus 31 crosses the data track 112 at cross points A and B, as shown in FIG. 6A. At the cross point A, the data track 112 moves toward the reference locus 51, which indicates that the number of data tracks between the beam locus 31 and the reference locus 51 increases, and thus M is increased by one (M=M+1). At the cross point B, the data track 112 moves away from the reference locus 51, which indicates that the number of data tracks between the beam locus 31 and the reference locus 51 decreases, and thus M is reduced by one (M=M−1). Accordingly, for the optical disk 11 at rotation, the number of data tracks between the beam locus 31 and the reference locus 51 is dynamically recorded.

Subsequently, the detection time T is reduced (step S606). Before the detection time T is reduced to zero, it is determined if the number M is smaller than the minimum track number M_MIN; if yes, the minimum track number M_MIN is set as the number M (step S607); if not, it is further determined if the number M is greater than the maximum track number M_MAX, and if yes, the maximum track number M_MAX is set as the number M (step S608). Thus, the maximum and minimum numbers of data tracks between the beam locus 31 and the reference locus 51 can be obtained. Also, before the detection time T is reduced to zero, steps S603 to S608 are repeated, and when the detection time T is reduced to zero, a runout track number is computed by subtracting the minimum track number M_MIN from the maximum track number M_MAX (step S609).

As cited, the invention uses a corresponding difference generated at the radial runout for the tracking error to thus find the number of runout tracks, and multiplies the runout track number by the track pitch (a distance between the data tracks on the optical disk) to thus obtain a physical radial runout D generated on the optical disk. Thus, without using the three-phase motor to refer the FG signal to obtain the rotary cycles, a typical signal phase DC motor can be used, and the radial runout can be detected accurately since the focusing operation is complete. Accordingly, the optical disk drive can have better performance, reliability, and its manufacture cost can be significantly reduced.

The above-mentioned steps can be written as a firmware program in any suitable computer language, and be compiled or assembled for execution. The program can be stored on any recording media that can be recognized and decoded by a processing unit, or any product comprising such a recording media. The recording media can be a hard disk, a floppy disk, an optical disk, a ZIP disk, an MO, an IC chip, RAM, or any other known product. As all of the detailed steps are completely described, there is no need for further explanation.

Although the present invention has been explained in relation to its preferred embodiment, it is to be understood that many other possible modifications and variations can be made without departing from the spirit and scope of the invention as hereinafter claimed.

What is claimed is:

1. A radial runout detection method for an optical disk drive, the optical disk drive using an optical pickup unit to generate a beam spot, the beam spot shaping a beam locus on an optical disk, thereby reading stored information of multiple data tracks on the optical disk, the method comprising the steps of:
    (A) setting a reference locus, which is a virtual locus at a predetermined location distant from a current beam locus by M (M is a positive integer) tracks;
    (B) setting a minimum track number M_MIN, a maximum track number M_MAX, and a detection time to execute steps (C) to (E) during the detection time;
    (C) increasing the track number M when a data track crossing the current beam locus on the optical disk moves toward a direction of the reference locus with respect to the current beam locus, and otherwise decreasing M;
    (D) setting the minimum track number M_MIN as the track number M when the track number M decreased is smaller than the minimum track number M_MIN;
    (E) setting the maximum track number M_MAX as the track number M when the track number M increased is greater than the maximum track number M_MAX; and
    (F) computing a runout track number by subtracting the minimum track number M_MIN from the maximum track number M_MAX.

2. The method as claimed in claim 1, wherein the detection time in step (B) is greater than time required for the optical disk to spin one cycle.

3. The method as claimed in claim 2, wherein the minimum track number M_MIN and the maximum track number M_MAX are initialized as the track number M.

4. The method as claimed in claim 1, further comprising a step of computing a radial runout by multiplying the runout track number by a track pitch.

5. An optical disk drive with a computer readable storage medium storing a program for detection of a radial runout of an optical disk, which uses an optical pickup unit to generate a beam spot that shapes a beam locus on an optical disk, thereby reading stored information of multiple data tracks on the optical disk, the program comprising computer program codes configured to cause execution of the steps of:
    (A) setting a reference locus, which is a virtual locus at a predetermined location distant from a current beam locus by M (M is a positive integer) tracks;
    (B) setting a minimum track number M_MIN, a maximum track number M_MAX and a detection time to execute steps (C) to (E) during the detection time;
    (C) increasing the track number M when a data track crossing the current beam locus on the optical disk moves toward a direction of the reference locus with respect to the current beam locus, and otherwise decreasing the track number M;
    (D) setting the minimum track number M_MIN as the track number M when the track number M decreased is smaller than the minimum track number M_MIN;
    (E) setting the maximum track number M_MAX as the track number M when the track number M increased is greater than the maximum track number M_MAX; and
    (F) computing a runout track number by subtracting the minimum track number from the maximum track number.

6. The optical disk drive as claimed in claim 5, wherein the detection time in step (B) is greater than time required for the optical disk to spin one cycle.

7. The optical disk drive as claimed in claim 6, wherein the minimum track number M_MIN and the maximum track number M_MAX are initialized as the track number M.

8. The optical disk drive as claimed in claim 5, further comprising a step of computing the radial runout by multiplying the runout track number by a track pitch.

9. A computer readable storage medium storing a program to detect a radial runout of an optical disk in an optical disk drive, the optical disk drive using an optical pickup unit to generate a beam spot that shapes a beam locus on an optical disk, thereby reading stored information of multiple data tracks on the optical disk, the program comprising:
    a first code to set a reference locus, which is a virtual locus at a predetermined location distant from a current beam locus by M (M is a positive integer) tracks;
    a second code to set a minimum track number M_MIN, a maximum track number M_MAX and a detection time to execute the third to fifth codes during the execution time;
    a third code to increase the track number M when a data track crossing the current beam locus on the optical disk moves toward a direction of the reference locus with respect to the current beam locus, and otherwise to decrease the track number M;
    a fourth code to set the minimum track number M_MIN as the track number M when the track number M decreased is smaller than the minimum track number M_MIN;
    a fifth code to set the maximum track number M_MAX as the track number M when the track number M increased is greater than the maximum track number M_MAX; and
    a sixth code to compute a runout track number by subtracting the minimum track number from the maximum track number.

10. The readable storage medium as claimed in claim 9, wherein the detection time in the second code is greater than time required for the optical disk to spin one cycle.

11. The readable storage medium as claimed in claim 10, wherein the minimum track number M_MIN and the maximum track number M_MAX are initialized as the track number M.

12. The readable storage medium as claimed in claim 9, further comprising a step of computing the radial runout by multiplying the runout track number by a track pitch.

* * * * *